United States Patent [19]

Karasaki et al.

[11] Patent Number: 4,808,808
[45] Date of Patent: Feb. 28, 1989

[54] FOCUS DETECTING OPTICAL SYSTEM INCLUDING TWO PRISMS FOR LIGHT REFRACTION

[75] Inventors: Toshihiko Karasaki, Sakai; Tokuji Ishida, Daito; Masataka Hamada, Osaka; Toshio Norita, Sakai; Nobuyuki Taniguchi, Nishinomiya, all of Japan

[73] Assignee: Minolta Camera Kabushiki Kaisha, Osaka, Japan

[21] Appl. No.: 5,088

[22] Filed: Jan. 20, 1987

[30] Foreign Application Priority Data

Jan. 20, 1986 [JP] Japan ............................ 61-10491

[51] Int. Cl.$^4$ .............................................. G01J 1/20
[52] U.S. Cl. ................................. 250/201; 354/408
[58] Field of Search .................. 250/201 PF, 204, 208, 250/209, 578; 356/1, 4; 354/406, 407, 408

[56] References Cited

U.S. PATENT DOCUMENTS

| | | |
|---|---|---|
| 3,529,528 | 9/1970 | Leitz . |
| 3,875,401 | 4/1975 | Stauffer . |
| 4,526,458 | 7/1985 | Kawamura ........................ 354/406 |
| 4,548,495 | 10/1985 | Suzuki ............................ 250/201 P |
| 4,560,863 | 12/1985 | Matsumura et al. . |
| 4,634,255 | 1/1987 | Suda ................................ 354/406 |
| 4,636,624 | 1/1987 | Ishida et al. ..................... 250/201 |
| 4,659,917 | 4/1987 | Suzuki ............................ 354/407 |
| 4,687,917 | 8/1987 | Kusaka ............................ 354/408 |
| 4,688,920 | 8/1987 | Suda ................................ 354/406 |
| 4,697,905 | 10/1987 | Fujibayshi ...................... 354/406 |
| 4,699,493 | 10/1987 | Koyama .......................... 354/406 |

*Primary Examiner*—David C. Nelms
*Assistant Examiner*—Jessica Ruoff
*Attorney, Agent, or Firm*—Price, Gess & Ubell

[57] ABSTRACT

A focus detecting optical system including a condenser lens disposed in a vicinity of or rearwardly of a predetermined focal plane of a photographic lens, an image forming lens unit having a pair of image forming lens sections disposed symmetrically relative to a main optical axis, a light blocking member having an opening for regulating a luminous flux coming into the image forming lens unit, a first prism for refracting the luminous flux in a direction departing from the main optical axis, a second prism for refracting the luminous flux in a direction nearing the main optical axis and a light receiving element array. An image formed on the light receiving element array and formed of the luminous flux carried through the condenser lens, the first prism, one of the image forming lens sections and the second prism and an image formed on the light receiving element array and formed of the luminous flux carried through the condenser lens, the first prism, the other image forming lens section and the second prism are placed with a sufficient distance therebetween by working of the first and second prisms. A focus detecting operation is carried out by comparing these images.

13 Claims, 4 Drawing Sheets

FOCUS DETECTING OPTICAL SYSTEM INCLUDING TWO PRISMS FOR LIGHT REFRACTION

BACKGROUND OF THE INVENTION

1. FIELD OF THE INVENTION

The present invention relates to focus detecting optical system employed, e.g. for an automatic focusing photographic camera, and more particularly to a focus detecting optical system comprising a condenser lens in the vicinity or rearwardly of a predetermined focal plane of a photographic lens, a pair of image forming lenses disposed symmetrically with each other relative to a main optical path and rearwardly of the condenser lens and a light blocking member disposed forwardly of the image forming lenses and defining openings for regulating incoming luminous flux such that a focal point of the photographic lens is detected by comparing images of the predetermined focal plane formed on a light receiving element array by the pair of image forming lenses.

It is to be noted here that the predetermined focal plane denotes a plane positioned from the photographic lens at a distance equal to that between the photographic lens and a film face, i.e. the plane on which an image is always formed with the photographic lens being at its focused condition.

2. DESCRIPTION OF THE PRIOR ART

Various kinds of focus detecting optical systems having the above-described construction have been proposed and have also been embodied thus far. However, the conventional constructions have a problem in that it is impossible to expand a detection sensitivity range in an angle of view because of a characteristic limit of an employed photographic lens.

In order to illustrate more fully this problem, a conventional construction will be described firstly with reference to FIG. 5. A primary image I formed in the vicinity of a predetermined focal plane Fo of a photographic lens (not shown) is re-formed by a pair of image forming lenses 17a, 17b through an infrared ray cut filter 12, a condenser lens 13 and a pair of openings 16a, 16b defined in a light blocking member 16, thereby forming two secondary images Ia, Ib on a light receiving element array 20. And, a focal point of the photographic lens is detected by detecting a change in positions of these two secandary images Ia, Ib.

If the detection sensitivity range is doubled for example, the primary image I becomes I' and the secondary images Ia and Ib become Ia' and Ib' respectively, whereby the secondary images Ia' and Ib' partially interfere with each other and the focus detecting operation becomes impossible. One way to avoid this mutual inteference between the secondary images is to increase decentering value Xt of the image forming lenses 17a, 17b from a main optical path '1'. However, if the decentering value Xt is set to be much larger than a decentering value Xm of the openings 16a, 16b, horizontal aberrations such as coma aberration and distortion increase thereby to deteriorate the quality of the secondary images Ia', Ib'. In order to avoid this deterioration of the quality of the secondary images, it is possible to increase both the decentering value Xt of the image forming lenses 17a, 17b and the decentering value Xm of the openings 16a, 16b. However, if the decentering value Xm of the openings 16a, 16b is increased, an inclination $\theta$ of the luminous flux used for the focus detection relative to the main optical axis '1' is also increased. And, this increase in the inclination $\theta$ causes vignetting in effective luminous flux in case of a photographic lens having a large F number whereby the focus detection is impossible.

As described above, with the conventional constructions, if the detection sensitivity range is increased, only a photographic lens having a small F number may be used. On the other hand, in order to enable the focus detection with the photographic lens having a large F number, the detection sensitivity range need be decreased. With a small detection sensitivity range, it is impossible to follow a fast moving object since the object easily exceeds the detection sensitivity range or the focus detecting operation is impossible because a sufficientlycontrasted portion is not held within the focus detection sensitivity range with a desired composition.

SUMMARY OF THE INVENTION

Taking the above state of the art into consideration, it is the object of the present invention to provide a focus detecting optical system which is not considerably restricted by the F number of an employed photographic lens and at the same time is capable of considerably increasing the detection sensitivity range in an angle of view.

In order to accomplish the above object, the focus detecting optical system according to the present invention comprises a condenser lens disposed in a vicinity of or rearwardly of a predetermined focal plane of a photographic lens, image forming lens means disposed rearwardly of the condenser lens and including a pair of image forming lens sections disposed symmetrically relative to a main optical axis, a light blocking member disposed forwardly of the image forming lens means and having an opening for regulating a luminous flux coming into the image forming lens means, first prism means disposed between the image forming lens means and the light blocking member and adapted for refracting the luminous flux in a direction departing from the main optical axis, second prism means disposed rearwardly of the first prism means and adapted for refracting the luminous flux in a direction nearing the main optical axis and a light receiving element array disposed rearwardly of the second prism means, the luminous flux coming through the condenser lens, the first prism means, the image forming lens means and through the second prism means being formed into images on the light receiving element array. According to the above construction, a focus detecting operation is carried out by comparing one of the images formed on the light receiving element array carried through the condenser lens, the first prism means, one of the image forming lens sections and the second prism means with the other of the images formed on the light receiving element array carried through the condenser lens, the first prism means, the other of the image forming lens sections and the second prism means.

Therefore, since the first prism for refracting the light in the direction departing from the main optical axis is disposed forwardly of the image forming lenses, the luminous flux from the condenser lens comes into the image forming lenses as being refracted by the first prism in the direction departing from the main optical axis. Without any further arrangement, the image forming by the image forming lenses will remain biasedly angled relative to the light receiving element array; however, since the second prism disposed forwardly of this light receiving element array corrects the angle bias, the images formed on the light receiving element array through the image forming lenses are almost free from the angle bias. As a result, it is possible to reliably form the two secondary images on the light receiving element array without considerably increasing the inclination $\theta$ shown in FIG. 5, and at the same time it is also possible to prevent the mutual interference between the two secondary images thereby to increase the detection sensitivity range. Consequently, the increased detection sensitivity makes it possible to follow a fast moving object and facilitates it to hold the sufficiently-contrasted portion within the detection sensitivity range, whereby the impossibility of a focus detecting operation may be avoided as much as possible.

DESCRIPTION OF THE PREFERRED EMBODIMENTS

Figure 1:
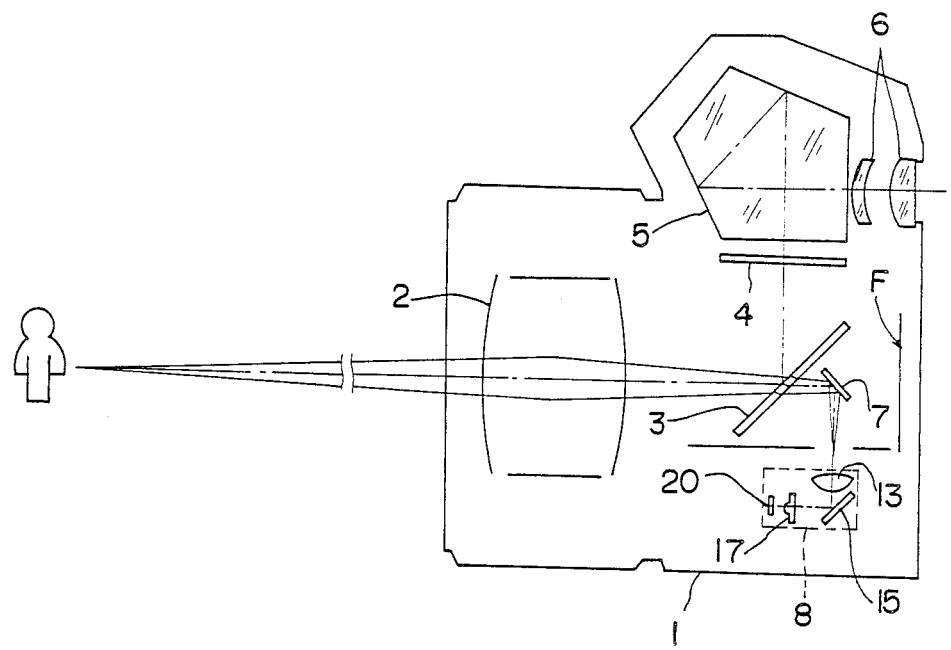
FIG. 1 is a schematic side view showing an inner construction of a photographic camera employing a focus detecting optical system related to the present invention.

Preferred embodiments of the present invention as applied to a focus detecting apparatus of a single-lens reflex camera will be particularly described hereinafter with reference to the accompanying drawings. FIG. 1 schematically shows a whole configuration of a photographic camera. A camera body 1 accommodates an exchangeable photographic lens 2 and a viewfinder optical unit including a rotatable main mirror 3, a focusing screen 4, a pentagonal roof prism 5, an ocular lens 6 and the like. Rearwardly of the main mirror 3 is disposed an auxiliary mirror 7 for downwardly reflecting a part of luminous flux coming through the photographic lens 2. Downwardly of this auxiliary mirror 7 is disposed a focus detecting module 8 for detecting a focus of the photographic lens 2 based on the luminous flux reflected by the auxiliary mirror 7.

Figure 2:
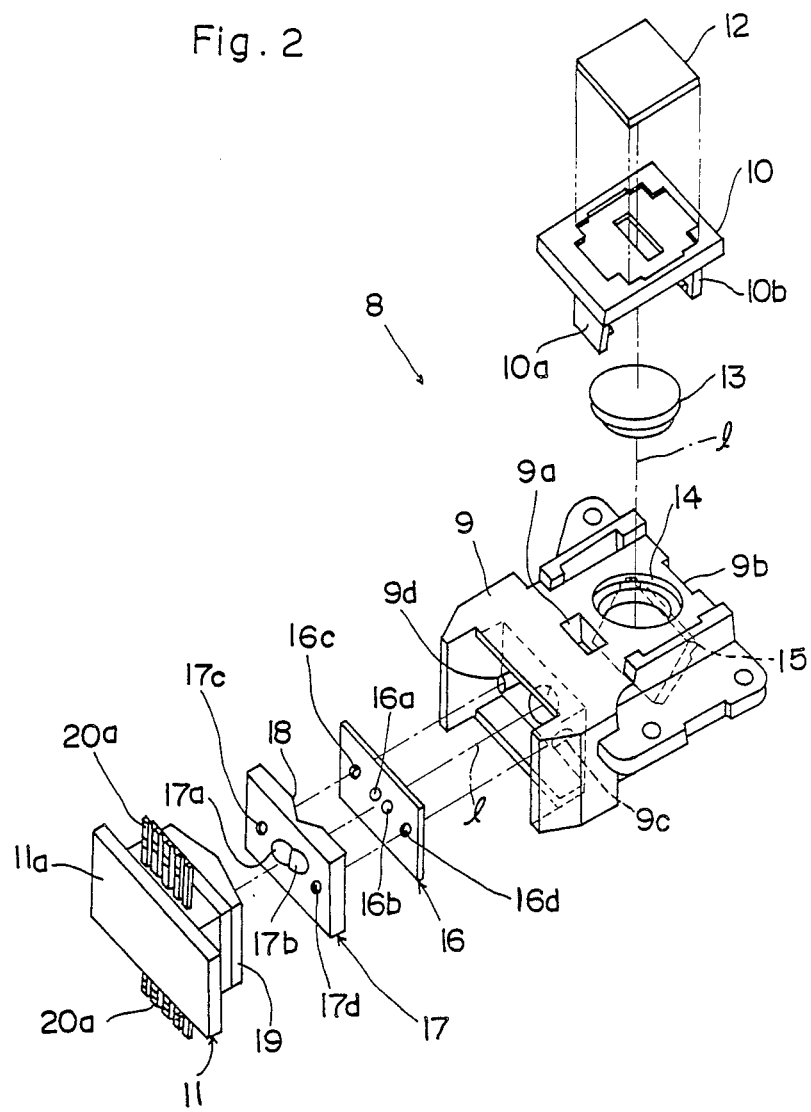
FIG. 2 is an exploded perspective view showing a focus detecting module as an embodiment of the present invention.

This focus detecting module 8 includes, as shown in FIG. 2, a module body 9, a visual field mask 10, a light receiving element package 11 and the like. To the visual field mask 10 is attached an infrared ray cut filter 12. By engaging elastic leg portions 10a, 10b of this visual field mask 10 respectively into an engaging pore 9a and an engaging cutout 9b defined in the module body 9, a condenser lens 13 may be fixedly held at an opening 14 of the module body 9. Inside the module body 9, a refracting mirror 15 is fixedly disposed which is inclined by 45° relative to a main optical axis '1' reflected by the auxiliary mirror 7. Rearwardly of an optical path extending from this refracting mirror 15, there are provided a light blocking member 16 defining a pair of openings 16a, 16b disposed symmetrically relative to the main optical path '1' and a transparent plate 17 formed of plastic and having a pair of image forming lenses 17a, 17b disposed also symmetrically relative to the main optical path '1'. This transparent plate 17, as shown in FIG. 1, defines a 'V' shaped cutout at a side thereof disposed forwardly of the optical path. More particularly, forwardly of the image forming lenses 17a, 17b there is formed integrally with and of the same material as the image forming lenses 17a, 17b a first prism 18 for refracting light in a direction departing from the main optical path '1'. By engaging a pair of pores 16c, 16d defined in the light blocking member 16 and a pair of pores 17c, 17d defined in the trasparent plate 17 respectively with pins 9c, 9d planted in the module body 9 with the light blocking member 16 being disposed forwardly of the optical path, the light blocking member 16 and the transparent plate 17 are positioned relatively with each other. The light receiving element package 11 has a conventional construction in which a CCD array chip 20 (referring to FIG. 3) by way of example of a light receiving array serially aligned on a base plate 11a is covered with transparent glass, and the output terminals 20a of the CCD array chip 20 project upwardly and downwardly of the base plate 11a. The light receiving element package 11 may be also fixedly attached to the module body 9. The glass covering the CCD array chip 20 integrally forms a second prism 19 which is disposed forwardly of the CCD array chip 20 as shown in FIG. 2 such that this second prism 19 refracts and inclines the light nearing the main optical axis '1'.

Figure 3:
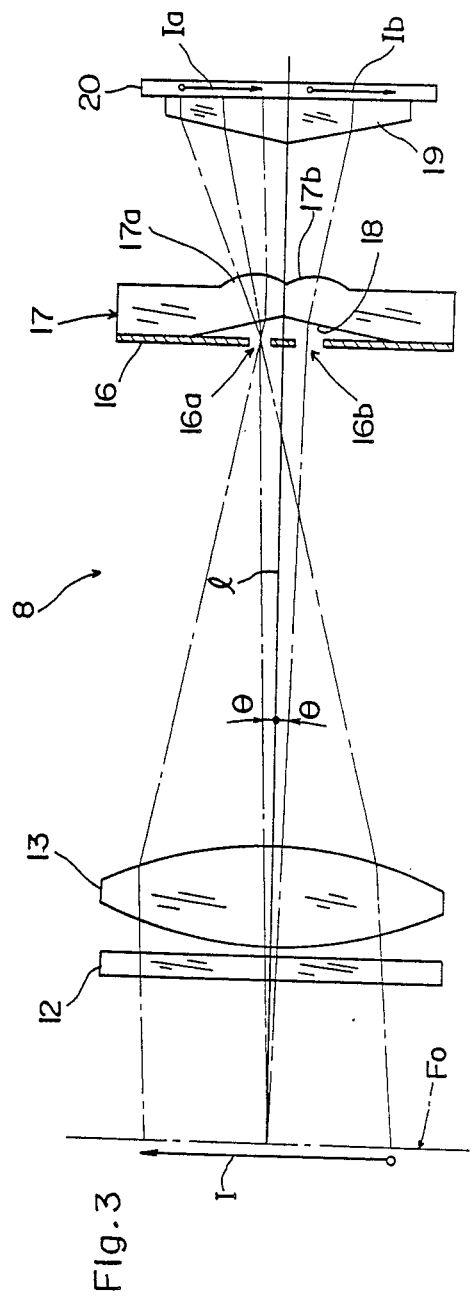
FIG. 3 is a development showing the focus detecting optical system as an embodiment of the present invention.

FIG. 3 is a development of an optical system of this focus detecting module 8, in which a predetermined focal plane Fo shown in FIG. 1 equivalent to a film face F is positioned immediately forwardly of the condenser lens 13 and a primary image 'I' is formed in the vicinity of this predetermined focal plane Fo. This primary image 'I' is re-formed by the image forming lenses 17a, 17b through the infrared ray cut filter 12, the condenser lens 13, and through the pair of openings 16a, 16b defined in the light blocking member 16 to form two secondary images Ia, Ib on the light receiving element array 20. The present invention does not differ from the prior art in that a focal point of the photographic lens 2 is detected by detecting a change in position of these secondary images Ia, Ib. However, according to the present invention, since the first prism is provided between the light blocking member 16 and the image forming lens 17a, 17b, the luminous flux from the condenser lens 13 is refracted and inclined in the direction departing from the main optical path '1'. Thereafter, the luminous flux goes through the image forming lenses 17a, 17b thereby to be re-formed. In the course of the above process, since the second prism 19 is provided forwardly of the light receiving element array 20, the inclination by the first prism 18 is corrected and the images are re-formed on the light receiving element array 20. Therefore, compared with the prior art, it is possible without increasing an inclination to prevent a mutual inteference between the two secondary images Ia, Ib on the light receiving element array thereby to expand a detection sensitivity range in an angle of view.

Figure 4:
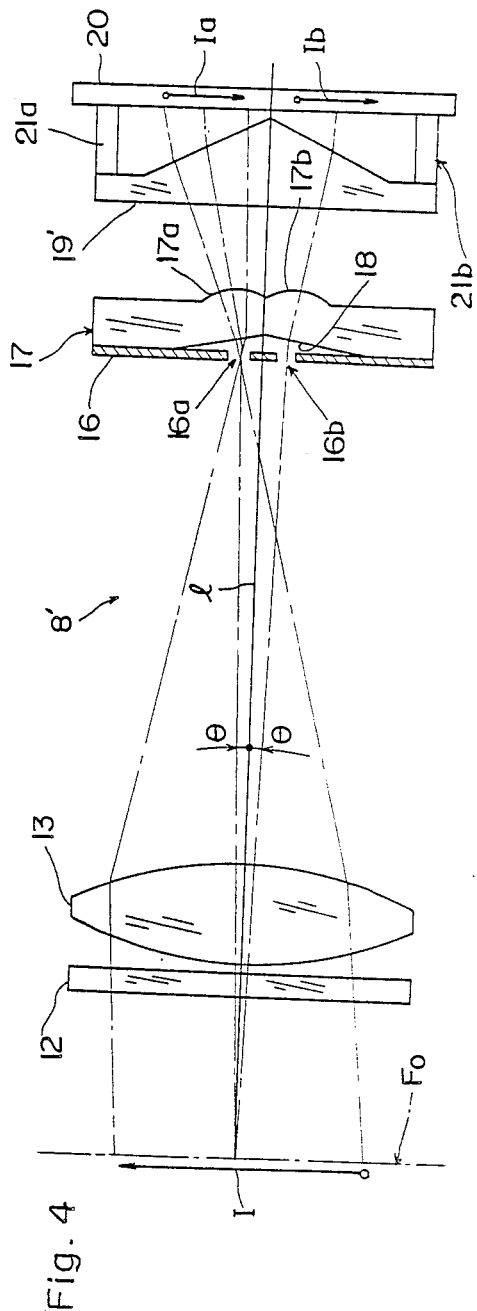
FIG. 4 is a development showing a focus detecting optical system according to another embodiment of the present invention.
Figure 5:
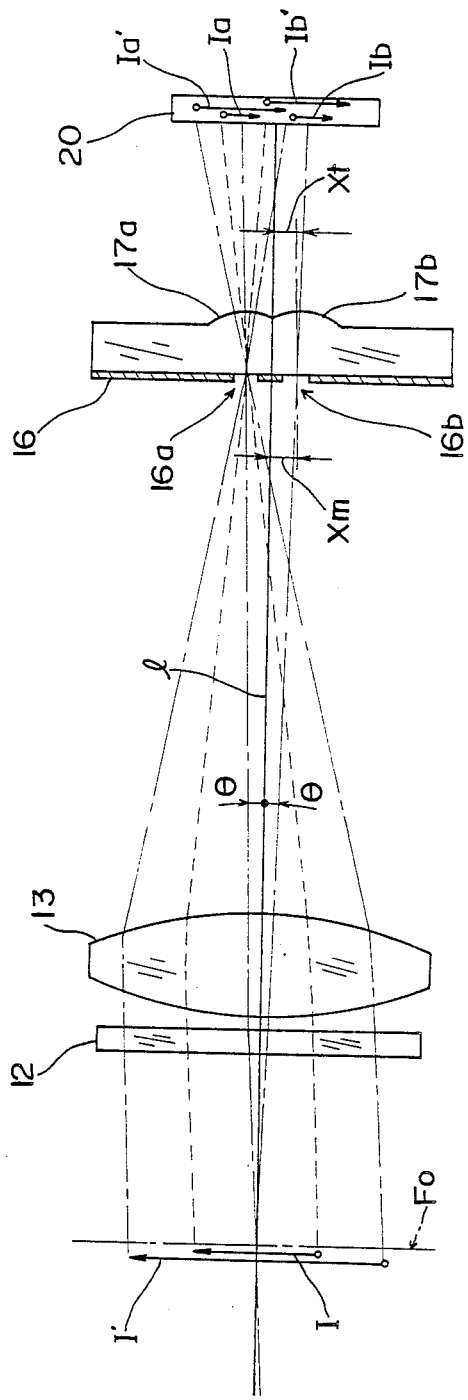
FIG. 5 is a development showing a focus detecting optical system of a conventional construction.

FIG. 4 is a development of an optical system of a focus detecting module 8' according to another embodiment of the present invention. In this embodiment, a second prism 19' is formed independently of the glass covering the light receiving element array 20 and is disposed forwardly of the light receiving element array 20 through holding members 21a, 21b. Further, this second prism 19' is placed in a position inverted relative to the second prism 19 shown in FIG. 1, but does not differ from the latter in its effect of refracting the light in the direction nearing the main optical axis '1'. The rest of the construction are the same as those in the previous embodiment shown in FIG. 3, and thus are given the same reference marks and will not be described.

According to still another embodiment of the present invention, the image forming lenses 17a, 17b may be provided separately from each other and at the same time a part of the first prism 18 corresponding to the image forming lens 17a and the other part of the first prism 18 corresponding to the image forming lens 17b may be also formed separately from each other. Further, the second prism may also be formed of separate parts.

We claim:

1. A focus detecting optical system, comprising:
   a condenser lens disposed in a vicinity of or rearwardly of a predetermined focal plane of a photographic lens;
   image forming lens means disposed rearwardly of said condenser lens and including a pair of image forming lens sections disposed symmetrically relative to a main optical axis;
   a light blocking member disposed forwardly of said image forming lens means and having an opening for regulating a luminous flux coming into said image forming lens means;
   first prism means disposed between said image forming lens means and said light blocking member and adapted for refracting the luminous flux in a direction departing from the main optical axis;
   second prism means disposed rearwardly of said first prism means and adapted for refracting the luminous flux in a direction towards the main optical axis; and
   a light receiving element array disposed rearwardly of said second prism means, said light receiving element array having formed thereon images by said image forming lens means;
   whereby a focus detecting operation is carried out by comparing one of the images formed on said light receiving element array and formed of the luminous flux carried through said condenser lens, said first prism means, one of said image forming lens sections and said second prism means with the other of the images formed on said light receiving element array and formed of the luminous flux carried through said condenser lens, said first prism means, the other of said image forming lens sections and said second prism means.

2. A focus detecting optical system, as claimed in claim 1, wherein said pair of image forming lens sections of said image forming lens means are formed of a same material and formed integrally with each other.

3. A focus detecting optical system, as claimed in claim 2, wherein said first prism means and said image forming lens means are formed of a same material and formed integrally with each other.

4. A focus detecting optical system, as claimed in claim 3, wherein said second prism means is formed integratedly with and of a same material as a transparent cover covering said light receiving element array.

5. A focus detecting optical system, as claimed in claim 1, wherein said first prism means includes a prism portion formed integrally with and of a same material as one of said image forming lens sections of said image forming lens means and includes a prism portion formed integrally with and of a same material as the other of said image forming lens sections of said image forming lens means, said prism portions being provided independently of each other.

6. A focus detecting optical system, as claimed in claim 1, wherein said second prism means includes a prism portion formed integrally with and of a same material as one of said image forming lens sections of said image forming lens means and includes a prism portion formed integrally with and of a same material as the other of said image forming lens sections of said image forming lens means, said prism portions being provided independently of each other.

7. In a compact focus detecting device for a camera including an objective lens, means for detecting an image of an object from the objective lens, forming means having a pair of lenses and a first prismatic member for forming separate images of the object image passing through the objective lens and detecting means for detecting the separate image positions, the improvement comprising:
   reducing means positioned between the forming means and the detecting means and having a second prismatic member for reducing the relative displacement position of the separate images formed by the forming means on the detecting means.

8. The invention of claim 7 wherein the forming means includes an integral image forming member and prismatic member.

9. The invention of claim 7 wherein the forming means includes a first prismatic member for diverging rays of the separate images wherein the rays of one image are diverted away from the other image.

10. The invention of claim 9 wherein the forming means further includes a pair of lenses positioned on the image side of the first prismatic member.

11. The invention of claim 10 wherein the reducing means includes a second prismatic member on the image side of the lenses for converging rays of the separate images towards each other.

12. In a compact focus detecting device for a camera having an objective lens, means for detecting an image of an object from the objective lens, forming means for forming separate images of the object image passing through the objective lens and detecting means for detecting the separate image positions, the improvement comprising:
   a unitary prism and lens member positioned between the forming means and the detecting means for diverging rays of the separate images, and
   a prism member positioned on the image side of the unitary member for converging rays of the separate images on the detector means whereby the detection sensitivity range is increased.

13. The invention of claim 12 wherein the lens portion of the unitary member is on the image side of the prism position.

* * * * *